United States Patent
Gebreselassie et al.

(10) Patent No.: US 6,755,997 B2
(45) Date of Patent: Jun. 29, 2004

(54) METHOD OF MAKING IMPROVED VEHICLE FLOOR COVERINGS

(75) Inventors: Girma Gebreselassie, Southfield, MI (US); Anthony Messina, Royal Oak, MI (US); Surendra Khambete, West Bloomfield, MI (US)

(73) Assignee: Collins & Aikman Products Co., Troy, MI (US)

(*) Notice: Subject to any disclaimer, the term of this patent is extended or adjusted under 35 U.S.C. 154(b) by 0 days.

(21) Appl. No.: 10/383,705

(22) Filed: Mar. 7, 2003

(65) Prior Publication Data

US 2004/0056386 A1 Mar. 25, 2004

Related U.S. Application Data

(60) Provisional application No. 60/413,052, filed on Sep. 24, 2002.

(51) Int. Cl.[7] .......................... B29C 41/08; B29C 41/22
(52) U.S. Cl. ...................... 264/40.1; 264/162; 264/219; 264/243; 264/255; 264/257; 264/309
(58) Field of Search .................... 264/162, 163, 264/219, 220, 323.1, 243, 255, 309, 257, 40.1

(56) References Cited

U.S. PATENT DOCUMENTS

| | | | |
|---|---|---|---|
| 3,046,177 A | 7/1962 | Hankins | 156/78 |
| 3,674,109 A | 7/1972 | Murase | 181/32 |
| 3,703,424 A * | 11/1972 | Chamock et al. | 156/224 |
| 3,919,444 A | 11/1975 | Shayman | 428/95 |
| 4,263,356 A | 4/1981 | Nomura et al. | 428/138 |
| 4,283,457 A | 8/1981 | Kolsky et al. | 428/285 |
| 4,405,393 A | 9/1983 | Tillotson | 156/78 |
| 4,491,556 A | 1/1985 | Fujii et al. | 264/243 |
| 4,529,639 A | 7/1985 | Peoples, Jr. et al. | 428/95 |
| 4,579,764 A | 4/1986 | Peoples, Jr. et al. | 428/95 |
| 4,828,898 A | 5/1989 | Bailey | 428/88 |
| 4,851,283 A | 7/1989 | Holtrop et al. | 428/284 |
| 4,952,358 A | 8/1990 | Okina et al. | 264/134 |
| 4,966,799 A | 10/1990 | Lucca et al. | 428/95 |
| 5,055,341 A | 10/1991 | Yamaji et al. | 428/174 |
| 5,071,614 A * | 12/1991 | Grace | 264/322 |
| 5,082,716 A | 1/1992 | Satterfield et al. | 428/175 |
| 5,271,885 A | 12/1993 | Denker et al. | 264/46.5 |
| 5,298,694 A | 3/1994 | Thompson et al. | 181/286 |
| 5,486,398 A | 1/1996 | Weber et al. | 428/95 |
| 5,512,233 A | 4/1996 | Gallagher et al. | 264/321 |
| 5,662,996 A * | 9/1997 | Jourquin et al. | 428/318.8 |
| 5,677,027 A | 10/1997 | Masuda et al. | 428/96 |
| 5,766,722 A * | 6/1998 | Morimoto | 428/88 |
| 5,817,408 A | 10/1998 | Orimo et al. | 428/218 |
| 5,922,265 A | 7/1999 | Parekh | 264/257 |
| 5,942,321 A | 8/1999 | Romesberg et al. | 428/300.7 |
| 6,071,619 A * | 6/2000 | De Winter | 428/423.1 |
| 6,103,803 A | 8/2000 | Cheung et al. | 524/425 |
| 6,145,617 A | 11/2000 | Alts | 181/290 |
| 6,171,419 B1 | 1/2001 | Heiman et al. | 156/78 |
| 6,187,424 B1 | 2/2001 | Kjellqvist et al. | 428/220 |
| 6,254,956 B1 | 7/2001 | Kjellqvist et al. | 428/44 |
| 6,296,733 B1 * | 10/2001 | Hudkins et al. | 156/245 |
| 6,319,969 B1 | 11/2001 | Walther et al. | 524/300 |
| 6,335,379 B1 | 1/2002 | Leenslag et al. | 521/174 |
| 6,436,321 B1 * | 8/2002 | Ogawa et al. | 264/46.4 |
| 6,616,789 B2 * | 9/2003 | Price et al. | 156/245 |

* cited by examiner

Primary Examiner—Stefan Staicovici
(74) Attorney, Agent, or Firm—Myers Bigel Sibley & Sajovec

(57) ABSTRACT

Floor coverings and methods of producing same, are provided. A vehicle floor covering includes a barrier layer of polymeric material and a sound-absorbing backing layer bonded to the barrier layer. The barrier layer exposed surface includes various aesthetic and/or functional features. The barrier layer has variable thickness.

7 Claims, 4 Drawing Sheets

METHOD OF MAKING IMPROVED VEHICLE FLOOR COVERINGS

RELATED APPLICATIONS

This application claims the benefit of U.S. Provisional Application No. 60/413,052 which was filed Sep. 24, 2002, the disclosure of which is incorporated herein by reference in its entirety as if set forth fully herein.

FIELD OF THE INVENTION

The present invention relates generally to vehicles and, more particularly, to floor coverings for vehicles.

BACKGROUND OF THE INVENTION

It is generally desirable for vehicle interior articles, such as floor coverings, instrument panel skins, door panel skins, consoles, and pillars, etc., to have an attractive appearance, to maintain their shape and resist wear over long periods of use, and to provide sound absorption within a vehicle interior. In addition, due to increasing federal environmental regulations and decreasing availability of landfill space, there is increased interest in recycling post-consumer products such as vehicle floor coverings, interior trim panels, etc. Unfortunately, many conventional vehicle interior articles are formed from non-recyclable materials such as thermosetting resins, which cannot be re-melted and reused.

Thus, there is a need for recyclable vehicle interior articles that have durable, tough surfaces, that are impervious to water and most chemicals, and that are designed to be scratch and mar resistant. In addition, there is a need for recyclable vehicle interior articles that can reduce external noises (e.g., road noise, engine noise, vibrations, etc.), as well as noises emanating from within passenger compartments, while also being lightweight and low in cost.

SUMMARY OF THE INVENTION

In view of the above discussion, floor coverings and methods of producing same, are provided. A vehicle floor covering according to embodiments of the present invention includes a barrier layer of polymeric material and a sound-absorbing backing layer (decoupler layer) bonded to the barrier layer. The barrier layer exposed surface includes various aesthetic and/or functional features. The barrier layer has variable thickness. Thicker portions are formed by adding additional layers of barrier material to selected portions prior to molding.

Methods of producing vehicle floor coverings according to embodiments of the present invention include ascertaining portions of a floor covering that will require enhanced sound attenuation and/or that will be subjected to greater wear than other portions of the floor covering. A barrier layer is formed by applying at least two layers of barrier material on a mold surface. A first layer of typically unfilled polymeric barrier material is applied to a mold surface that is configured to provide the desired appearance on the barrier layer exposed surface when demolded. A second layer of filled or unfilled polymeric barrier material is then applied to the one or more portions of the first barrier layer identified as requiring additional sound attenuation and/or identified as being high wear areas.

The mold is closed and sound absorbing material, such as foam, is injected into the closed mold. The sound absorbing material and first and second barrier layers are then subjected to conditions within the mold sufficient to produce a floor covering having a desired shape and having an exposed surface with the desired appearance formed thereon. After molding operations, the floor covering is de-molded and subjected to trimming and/or one or more other finishing operations.

Vehicle floor coverings according to embodiments of the present invention may be lighter in weight than conventional vehicle floor coverings because barrier material can be reduced in areas not required for sound attenuation. Methods of producing vehicle floor coverings according to embodiments of the present invention require fewer manufacturing steps than conventional manufacturing methods and reduce material usage.

In addition, vehicle floor coverings according to embodiments of the present invention can achieve various performance characteristics including wear resistance, sound attenuation, colorability, color matching, gloss level, etc., that are superior to conventional vehicle floor coverings. For example, vehicle floor coverings according to embodiments of the present invention can achieve low gloss levels (e.g., gloss level less than 2 at 60° per ASTM D 523-89). Vehicle floor coverings according to embodiments of the present invention can have good abrasion resistance, and can have high tensile strength. Vehicle floor coverings according to embodiments of the present invention eliminate problems with odors and fogging caused by some conventional vehicle floor coverings. Vehicle floor coverings according to embodiments of the present invention can be UV stabilized. Moreover, vehicle floor coverings according to embodiments of the present invention are environmentally friendly in that they can be physically recycled for use in other interior trim applications.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1:
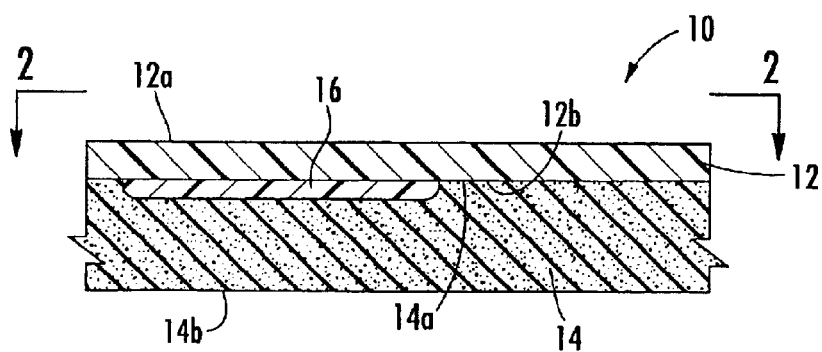
FIG. 1 is a side section view of a portion of a floor covering according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when any element such as a layer, region, substrate, etc. is referred to as being "on" another element, it can be directly on the other element, or intervening elements may be present. In contrast, when an element is referred to as being "directly on" another element, there are no intervening elements present. It will be understood that when an element is referred to as being "connected" or "attached" to another element, it can be directly connected or attached to the other element or intervening elements may be present. In contrast, when an element is referred to as being "directly connected" or "directly attached" to another element, there are no intervening elements present.

As is understood by those skilled in this art, the attenuation of vehicle external noise is conventionally referred to as sound transmission loss (STL). The attenuation of vehicle internal noise is conventionally referred to as sound absorption. The acoustic impedance of a material is defined as material density times acoustic velocity, and is expressed in units of Rayls (Newton-seconds/meter$^3$). Acoustic impedance defines how easy it is for air to move through a material. Thus, for fibrous materials, acoustic impedance depends upon the density of the fibrous material, as well as fiber diameter. Generally, the heavier the fibrous layer and the finer the fibers, the higher the acoustic impedance. Moreover, thicker fibrous layers typically have more acoustic impedance than thin fibrous layers. The ability of a material to attenuate noise is conventionally defined by the material's STL, acoustic impedance, and absorption characteristics.

Referring initially to FIG. 1, a vehicle floor covering 10, according to embodiments of the present invention, includes a barrier layer 12 of polymeric material and a sound-absorbing backing layer (decoupler layer) 14 bonded to the barrier layer 12 in face-to-face relationship. The barrier layer 12 includes opposite first (exposed) and second surfaces 12a, 12b. The backing layer 14 includes opposite first and second surfaces 14a, 14b. The barrier layer second surface and the backing layer first surface 14a are in face-to-face contacting relationship. The barrier layer exposed surface 12a includes various aesthetic and/or functional features, as will be described below.

The barrier layer 12 may include one or more polymeric materials and can have varying cross-sectional thicknesses, as illustrated. Exemplary polymeric materials that may be used as a barrier layer include engineering thermoplastic and thermosetting materials (e.g., polypropylene, polyurethane, polyvinylchloride, etc.). In addition, the barrier layer 12 may include various other components including, but not limited to, fillers (e.g., calcium carbonate, calcium hydroxide, aluminum trihydrate, talc, bentonite, barytes, silica, clay, mica, limestone and/or barium sulfate), dispersing agents (e.g., zinc stearate), pigments, and regrind/recycle materials. The barrier layer 12 has variable thickness as illustrated. Thicker portions are formed by adding one or more additional layers 16 of barrier material prior to molding, as will be described below. The sound-absorbing backing layer 14 may be formed from any type of thermoplastic and thermosetting foam (e.g., polyurethane foam, etc.) or fibrous material (e.g., thermoformable fibrous materials including those derived from natural and synthetic fibers).

An exemplary unfilled polyurethane barrier material that may be used in accordance with embodiments of the present invention is Bayer Elastomer (Bayer AG, Pittsburgh, Pa.). An exemplary filled polyurethane barrier material that may be used in accordance with embodiments of the present invention is available from Huntsman Corporation, Salt Lake City, Utah.

The floor covering 10 is formed into a three-dimensional shape during molding operations such that the sound-absorbing backing layer 14 attaches to a vehicle floor in contacting face-to-face relationship therewith. The floor covering 10 may include form retention characteristics such that it maintains a form imposed upon it during molding. Alternatively, the floor covering 10 may have elastic memory such that it is unable to maintain an unassisted non-flat configuration.

Figure 2:
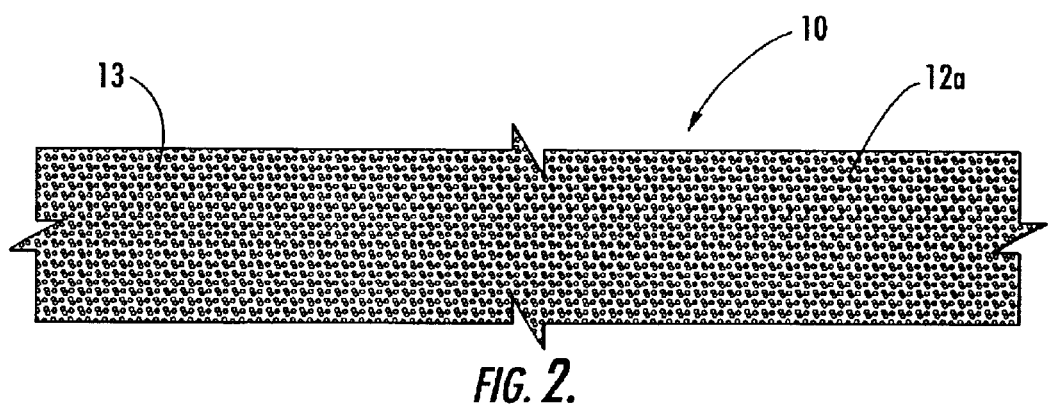
FIG. 2 is a top plan view of the floor covering of FIG. 1 taken along lines 2—2
Figure 4:
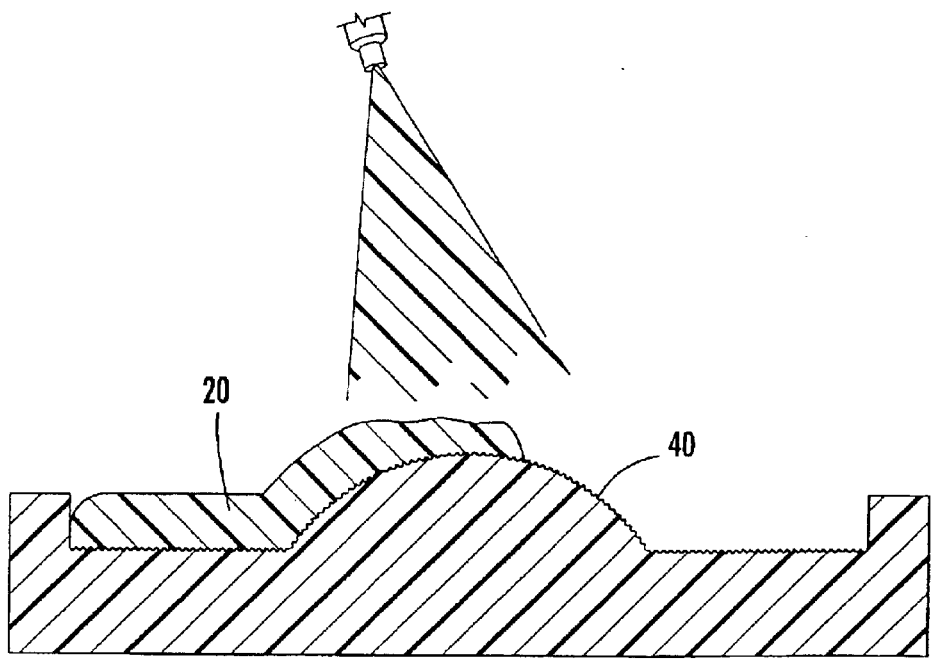
FIG. 4 is a schematic diagram that illustrates a first barrier layer being sprayed onto a mold surface according to embodiments of the present invention.

Referring now to FIG. 2, the illustrated barrier layer exposed surface 12a includes a decorative pattern 13 formed therein. The decorative pattern is formed via the mold surface upon which the barrier layer is initially applied within a mold. Virtually any type of decorative and/or functional pattern may be formed in the barrier layer exposed surface.

Referring now to FIGS. 3–7, operations for producing vehicle floor coverings, according to embodiments of the present invention, are illustrated. The acoustic properties of a vehicle floor (or other vehicle portion), on which a floor covering is to be placed may be ascertained to identify areas requiring additional sound attenuation characteristics. (Block 100). Acoustic properties of a vehicle floor may be ascertained by identifying areas of a vehicle floor through which sound within a predetermined frequency range passes at an intensity level that exceeds a threshold intensity level. Identifying areas of a vehicle floor through which sound within a predetermined frequency range passes at an intensity level that exceeds a threshold intensity level may include generating a sound intensity map of the vehicle floor. Sound intensity maps are well understood by those skilled in the art and need not be described further herein.

A barrier layer 12 (FIG. 1) is formed by applying at least two layers of barrier material on a mold surface. For example, a first layer of polymeric barrier material 20 is applied to a mold surface 40 (Block 110). The term "applying" as used herein is intended to include any manner of placing material onto a mold surface including, but not limited to, spraying, depositing, pouring, etc. The mold surface 40 is configured to provide the desired appearance on the barrier layer first surface (exposed surface when demolded) 12a. For example, the mold surface 40 may have a grain pattern that is configured to give the first barrier layer second surface the desired grain pattern. The first layer 20 of polymeric barrier material may have various thicknesses, but typically is between about 0.3 mm and about 2.0 mm. In the illustrated embodiment of FIG. 4, the first layer of barrier material 20 is sprayed onto the mold surface 40. However, other application techniques known to those skilled in the art may be utilized, also.

A second layer of polymeric barrier material 30 is then applied to one or more portions of the first barrier layer 20 (Block 120). According to embodiments of the present invention, the second barrier layer 30 may be applied to one or more selected portions of the exposed surface 20a (including the entire exposed surface) of the first barrier layer 20. These selected portions may be areas identified as requiring enhanced sound attenuation and/or areas identified as being high wear areas. In the illustrated embodiment of FIG. 5, the second barrier layer 30 is sprayed onto portions of the first barrier layer 20. However, other application techniques known to those skilled in the art may be utilized, also. The second layer of polymeric barrier material may have various thicknesses, but typically is between about 1.0 mm and about 6.0 mm.

In the illustrated embodiment, the first and second barrier layers 20, 30 combined form the barrier layer 12 of the floor covering 10 of FIG. 1.

Figure 6:
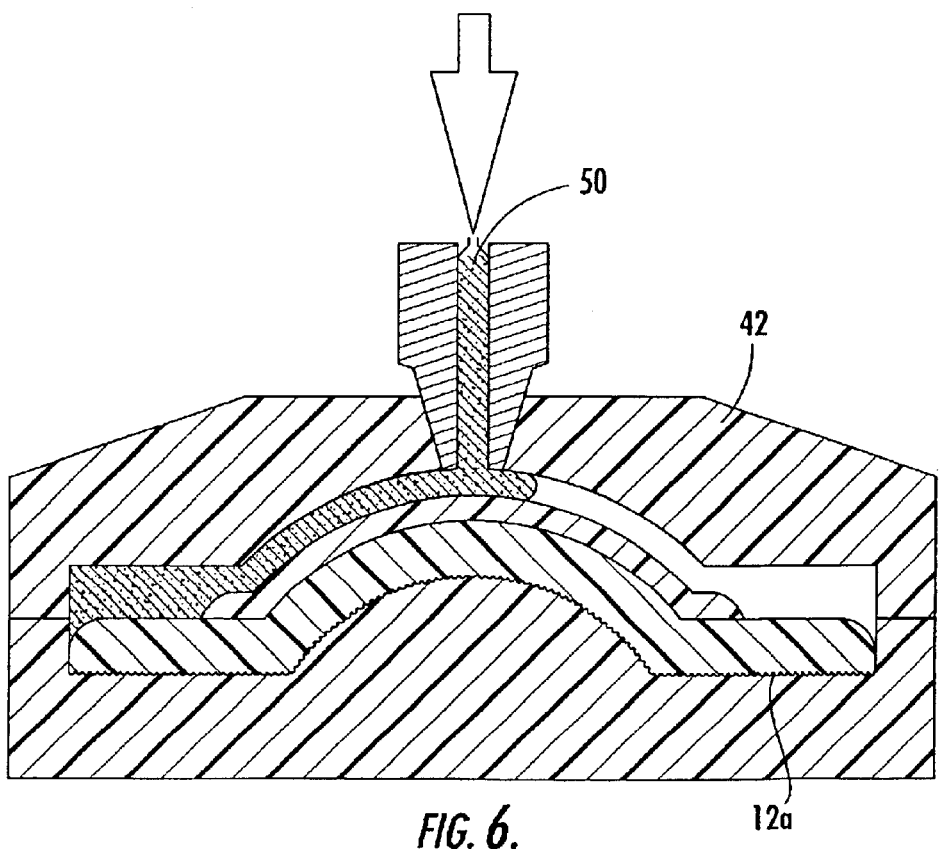
FIG. 6 is a schematic diagram that illustrates sound absorbing material being injected into the mold of FIGS. 4–5 to form a sound-absorbing backing layer attached to the first and second barrier layers according to embodiments of the present invention.
Figure 7:
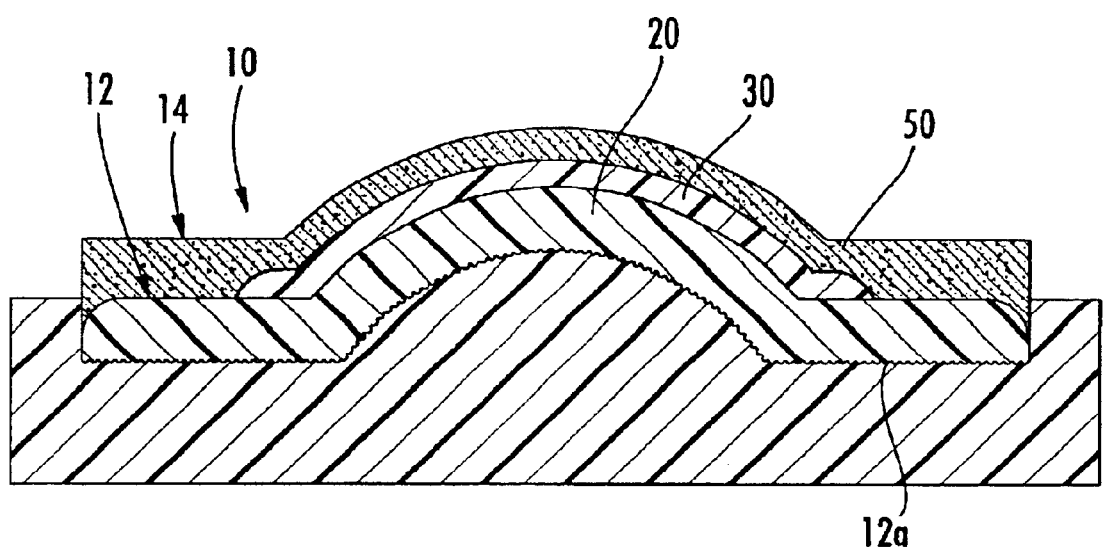
FIG. 7 is a schematic diagram that illustrates demolding the floor covering of FIGS. 4–6.

In the illustrated embodiment, the mold is then closed and sound absorbing material 50, such as foam, is injected into the closed mold 42 (Block 130), as illustrated in FIG. 6. The sound absorbing material 50 forms the backing (decoupler) layer 14 of FIG. 1. The sound absorbing material 50 and first and second barrier layers 20, 30 are then subjected to conditions within the mold (e.g., pressure and/or temperature) sufficient to produce a floor covering having a desired shape and having an exposed surface 12a (FIG. 2) with the desired appearance formed thereon (Block 140). After molding operations, the floor covering 10 is de-molded and subjected to trimming and/or one or more other finishing operations (Block 150).

Figure 3:
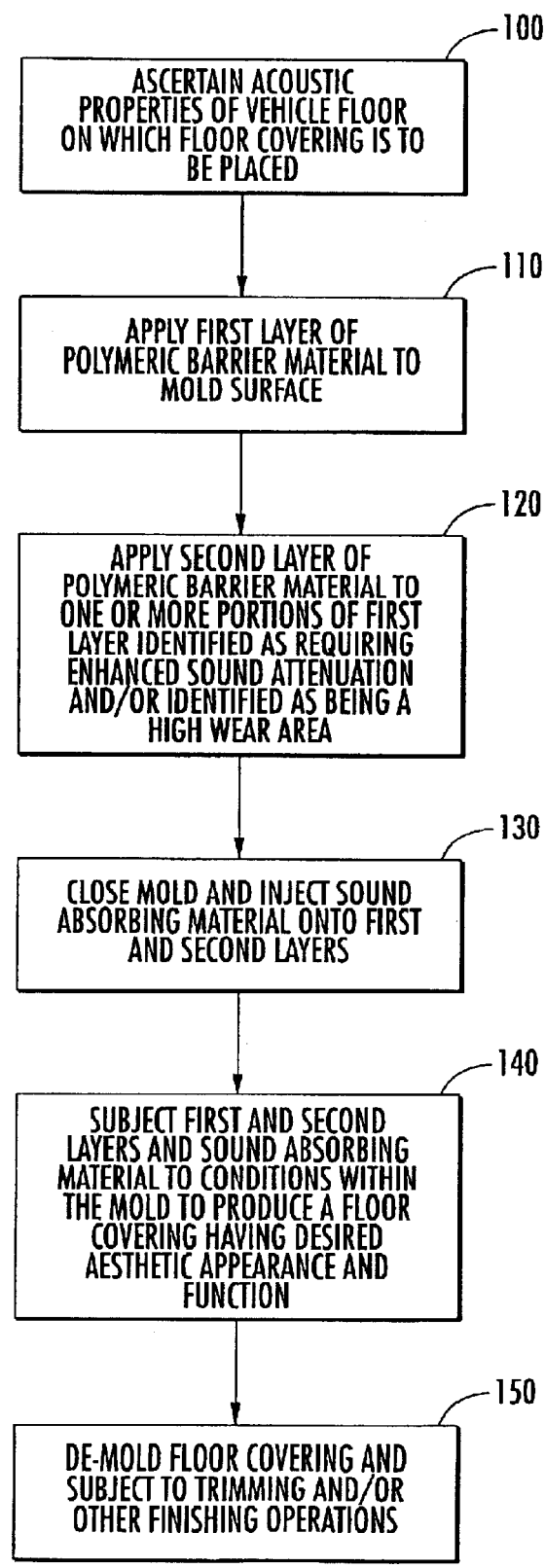
FIG. 3 is a flow diagram illustrating operations for producing vehicle floor coverings according to embodiments of the present invention.
Figure 5:
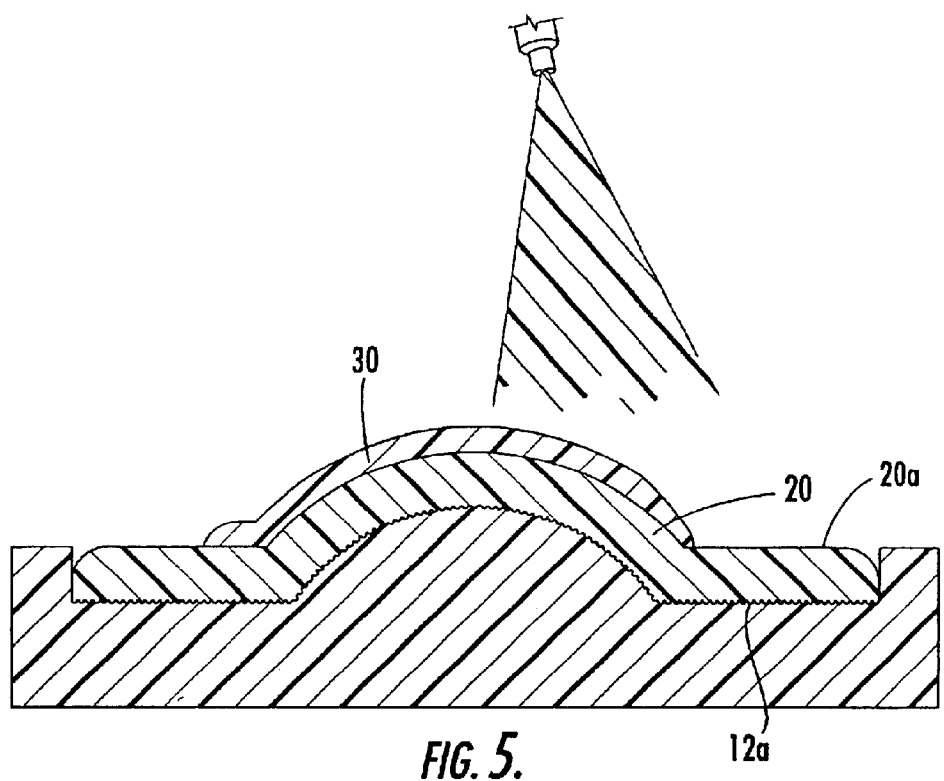
FIG. 5 is a schematic diagram that illustrates a second barrier layer being sprayed onto portions of the first barrier layer of FIG. 4 according to embodiments of the present invention.

According to embodiments of the present invention, various ones of the operations illustrated in FIG. 3 may be performed out of the illustrated order. Furthermore, some of the operations illustrated in FIG. 3 may be performed substantially simultaneously.

Floor coverings according to embodiments of the present invention can facilitate acoustical "tuning" wherein acoustical "hot spots" can be identified and additional barrier material can be added to attenuate sound. Floor coverings according to embodiments of the present invention can be "tuned" to provide desired sound attenuating characteristics in selected locations of a vehicle (e.g., floor panels, trunk floor, etc.). The term "tuned" means that portions of a floor covering can be formed to have a specific acoustic impedance designed to attenuate sound in one or more frequencies or frequency bands, and/or to have a specific absorption characteristic designed to absorb sound in one or more frequencies or frequency bands. Moreover, floor coverings according to embodiments of the present invention may have reduced overall weight compared with conventional sound proofing materials, and without sacrificing sound attenuation properties.

Vehicle floor coverings according to embodiments of the present invention can facilitate the incorporation of trim materials and accessories including, but not limited to, permanent and removable logos, inserts that match the interior decor of a vehicle, etc. Moreover, vehicle floor coverings according to embodiments of the present invention can facilitate the incorporation of wiring harnesses, clips and other electrical/mechanical devices.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. The invention is defined by the following claims, with equivalents of the claims to be included therein.

That which is claimed is:

1. A method of producing a vehicle interior floor covering, comprising:

ascertaining acoustic properties of a vehicle floor on which the floor covering is to be placed to identify the one or more portions of the floor covering requiring enhanced sound attenuation, comprising identifying areas of the vehicle floor through which sound within a predetermined frequency range passes at an intensity level that exceeds a threshold intensity level;

applying a first layer of polymeric barrier material onto a mold surface, wherein the mold surface is configured to impart a desired appearance on a surface of the first layer of polymeric barrier material;

applying a second layer of polymeric barrier material onto one or more portions of the first layer of polymeric material, wherein the one or more portions of the first layer of polymeric material correspond to areas of a vehicle floor identified as requiring enhanced sound attenuation;

applying a sound absorbing thermoformable foam material onto the second layer of polymeric barrier material and onto exposed portions of the first layer of polymeric barrier material such that the second layer of polymeric barrier material is completely encapsulated by the sound absorbing thermoformable foam material;

subjecting the first and second layers of polymeric barrier material and the sound absorbing foam material to conditions within the mold to produce a contoured floor covering having a desired shape; and removing the floor covering from the mold.

2. The method of claim 1, wherein the one or more portions correspond to high wear areas of the floor covering.

3. The method of claim 1, wherein ascertaining acoustic properties of a vehicle floor comprises generating a sound intensity map of a vehicle floor.

4. The method of claim 1, wherein the first and second layers of polymeric barrier material are applied by spraying.

5. The method of claim 1, further comprising subjecting the floor covering to post-molding operations.

6. The method of claim 1, wherein the first and second layers of polymeric barrier material comprise thermoplastic material or thermosetting material.

7. The method of claim 1, wherein the first and second layers of polymeric barrier material comprise polyurethane.

* * * * *